United States Patent
Gaurav

(10) Patent No.: US 10,154,399 B2
(45) Date of Patent: Dec. 11, 2018

(54) METHOD FOR OUTPUTTING CONTENT AND ELECTRONIC DEVICE FOR SUPPORTING THE SAME

(71) Applicant: SAMSUNG ELECTRONICS CO., LTD., Suwon-si, Gyeonggi-do (KR)

(72) Inventor: Dwivedi Gaurav, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 258 days.

(21) Appl. No.: 15/274,163

(22) Filed: Sep. 23, 2016

(65) Prior Publication Data

US 2017/0094037 A1    Mar. 30, 2017

(30) Foreign Application Priority Data

Sep. 25, 2015   (KR) ........................ 10-2015-0136657

(51) Int. Cl.
| | |
|---|---|
| *G01K 13/00* | (2006.01) |
| *H04M 1/02* | (2006.01) |
| *H04W 4/80* | (2018.01) |
| *H04M 1/60* | (2006.01) |
| *H04M 1/725* | (2006.01) |

(52) U.S. Cl.
CPC .............. *H04W 4/80* (2018.02); *G01K 13/00* (2013.01); *H04M 1/6066* (2013.01); *H04M 1/7253* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 2012/0049933 A1* | 3/2012 | Riechel ................... | G06F 1/206 327/512 |
| 2013/0091348 A1* | 4/2013 | Kwon ..................... | G06F 1/206 713/100 |
| 2014/0081630 A1 | 3/2014 | Jung | |
| 2014/0314120 A1* | 10/2014 | Feyh ....................... | G01J 5/505 374/121 |
| 2014/0329567 A1 | 11/2014 | Chan et al. | |
| 2014/0337732 A1 | 11/2014 | Bevilacqua et al. | |
| 2014/0357207 A1 | 12/2014 | Ma | |
| 2014/0357251 A1 | 12/2014 | Forutanpour et al. | |
| 2014/0364162 A1 | 12/2014 | Juang et al. | |

FOREIGN PATENT DOCUMENTS

| | | | |
|---|---|---|---|
| CN | 203012547 U | * | 6/2013 |
| CN | 205665554 U | * | 10/2016 |

* cited by examiner

*Primary Examiner* — Andre Allen
(74) *Attorney, Agent, or Firm* — Nixon & Vanderhye, P.C.

(57) ABSTRACT

An electronic device is provided. The electronic device may include a sensor module including sensing circuitry configured to sense a temperature of at least part of the electronic device and a processor electrically connected with the sensor module. The processor is configured to perform a function using a first output device operatively connected with the electronic device, to determine a temperature of the electronic device using the sensor module, while the function is executed, and to perform at least part of the function using a second output device operatively connected with the electronic device, if the temperature is within a predetermined temperature range.

20 Claims, 8 Drawing Sheets

METHOD FOR OUTPUTTING CONTENT AND ELECTRONIC DEVICE FOR SUPPORTING THE SAME

CROSS-REFERENCE TO RELATED APPLICATION

This application is based on and claims priority under 35 U.S.C. § 119 to a Korean patent application filed on Sep. 25, 2015 in the Korean Intellectual Property Office and assigned Serial number 10-2015-0136657, the disclosure of which is incorporated by reference herein in its entirety.

TECHNICAL FIELD

The present disclosure generally relates to a method for outputting content based on a temperature in an electronic device and the electronic device for supporting the same.

BACKGROUND

An electronic device such as a smartphone and a tablet personal computer (PC) may perform a variety of functions (or a variety of applications), for example, communication functions (e.g., a voice communication function, a video communication function, a data communication function, and the like) and media output functions (e.g., a photo output function and a video output function). The electronic device may be increased in temperature in a process of executing the functions (or the applications).

For one example, if a user of the electronic device continues performing a voice call, the electronic device may be increased in temperature with respect to its processor or its communication module. For another example, a temperature around the processor or a display of the electronic device in a process of outputting a video on the display.

If the electronic device is increased in temperature to a specified range or more, the user may feel uncomfortable or may get scalded in some cases and the electronic device may results in degradation in performance due to its deterioration or a fault occurs in the electronic device.

The electronic device according to the related art may result in an inconvenience to the user as it is increased in temperature, while it executes a function. While a function (or an application) of the electronic device is executed, it is suddenly ended as the electronic device is increased in temperature.

SUMMARY

Aspects of the present disclosure are provided to address at least the above-mentioned problems and/or disadvantages and to provide at least the advantages described below. Accordingly, an example aspect of the present disclosure is to provide an output method for providing a user with a convenience in using an electronic device by changing an output mode or an output device based on its temperature and the electronic device for supporting the same.

In accordance with an example aspect of the present disclosure, an electronic device is provided. The electronic device may include a sensor module configured to sense a temperature of at least part of the electronic device and a processor electrically connected with the sensor module. The processor may be configured to perform a function using a first output device operatively connected with the electronic device, to verify a temperature of the electronic device using the sensor module, while the function is executed, and to perform at least part of the function using a second output device operatively connected with the electronic device, if the temperature is included in a range.

BRIEF DESCRIPTION OF THE DRAWINGS

The above and other aspects, features, and advantages of the disclosure will be more apparent from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
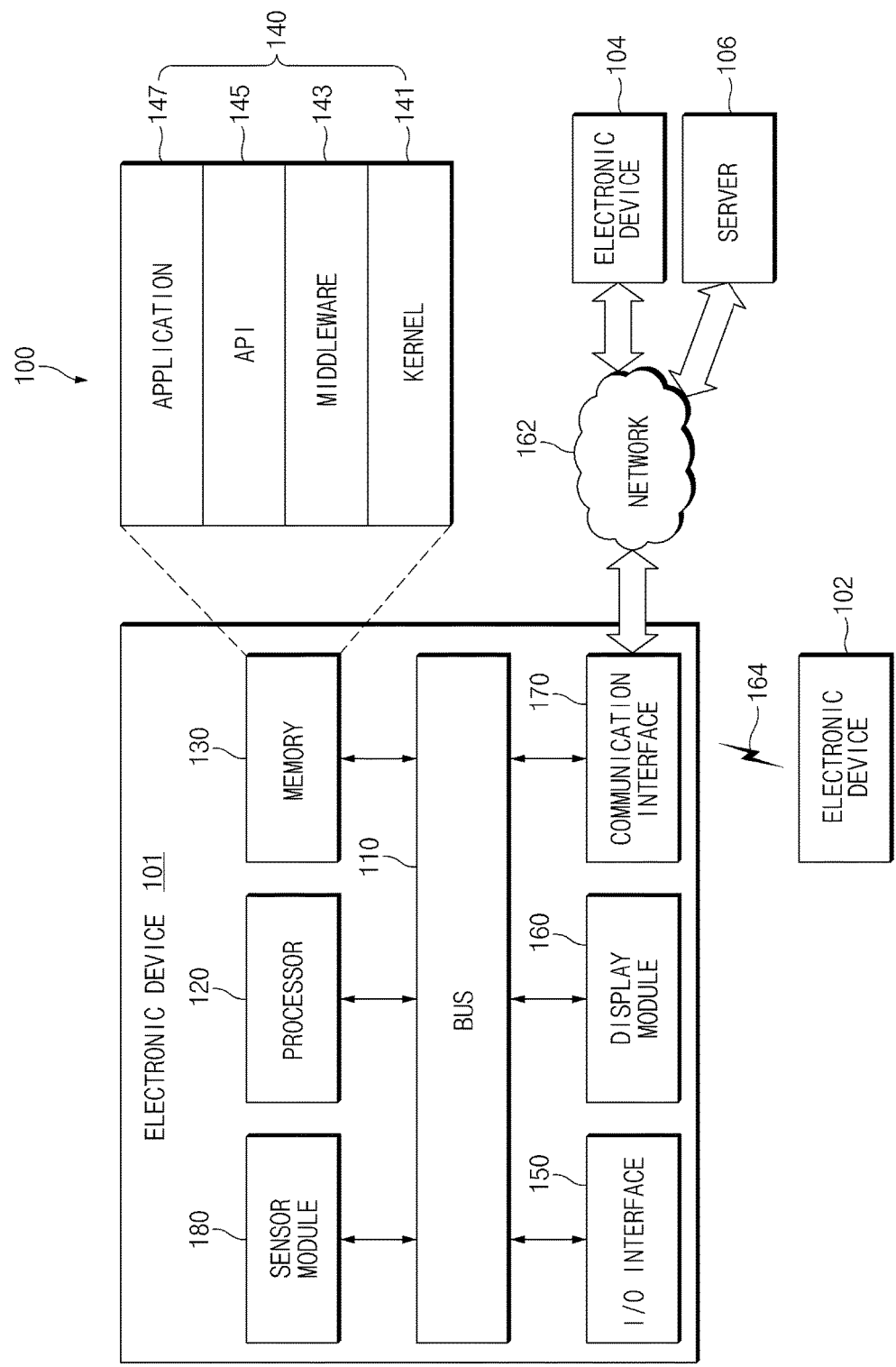
FIG. 1 is a block diagram illustrating an example configuration of an electronic device in a network environment according to various example embodiments.

Hereinafter, various example embodiments of the present disclosure will be described with reference to the accompanying drawings. Accordingly, those of ordinary skill in the art will recognize that modification, equivalent, and/or alternative on the various example embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this description are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the description, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices, or the like, but is not limited thereto. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits), or the like, but is not limited thereto.

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel, or the like, but is not limited thereto.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler), or the like, but is not limited thereto.

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device), or the like, but is not limited thereto. In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a block diagram illustrating an example configuration of an electronic device in a network environment according to various example embodiments.

Referring to FIG. 1, there is illustrated an electronic device 101 in a network environment 100 according to various embodiments. The electronic device 101 may include a bus 110, a processor 120, a memory 130, an input/output (I/O) interface (e.g., including interface circuitry) 150, a display 160, a communication interface (e.g., including communication circuitry) 170 and a sensor module (e.g., including various sensors and/or sensing circuitry) 180. According to an embodiment, the electronic device 101 may not include at least one of the above-described elements or may further include other element(s).

For example, the bus 110 may interconnect the above-described elements 120 to 170 and may include a circuit for conveying communications (e.g., a control message and/or data) among the above-described elements.

The processor 120 (e.g., the processor 110 of FIG. 1) may include one or more of a central processing unit (CPU), an application processor (AP), or a communication processor (CP). The processor 120 may perform, for example, data processing or an operation associated with control and/or communication of at least one other element(s) of the electronic device 101.

According to various embodiments, a processor 120 may change an output mode or an output device of a function (e.g., a voice call, video playback, and the like) executed in an electronic device 101 based on information measured by the sensor module 180. According to various embodiments, the function may be performed through execution of a related application. In various embodiments, the processor 120 may change an output mode or an output device based on a measurement value of a temperature of a specific point (e.g., a point adjacent to a processor chip or a communication chip) of the electronic device 101, measured by the sensor module 180. In various embodiments, the processor 120 may change an output device or an output mode of content (e.g., a sound, a voice, an image, and the like) according to execution of an application executed in the electronic device 101 based on information measured by the sensor module 180. Hereinafter, the output mode of the function executed by the electronic device 101 may refer to an output mode of the content.

Information about changing the output mode or the output device of the processor 120 may be provided with reference to FIGS. 2 to 8.

The memory 130 (e.g., the memory 160 of FIG. 1) may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include, for example, at least one interface or function (e.g., an instruction) for a file control, a window control, image processing, a character control, or the like.

The I/O interface 150 may include various interface circuitry configured to transmit an instruction or data, input from a user or another external device, to other element(s) of the electronic device 101. Furthermore, the I/O interface 150 may output an instruction or data, received from other element(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display, or the like. The display 160 may display, for example, various kinds of content (e.g., a text, an image, a video, an icon, a symbol, and the like) to a user. The display 160 may include a touch screen and may receive, for example, a touch, gesture, proximity, or hovering input using an electronic pen or a portion of a user's body.

The communication interface 170 may include various communication circuitry configured to establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 164. The local area network 164 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this description, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a part of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

The sensor module 180 may include various sensors or sensing circuitry configured to sense information in the electronic device 101 and a variety of information around the electronic device 101. In various embodiments, the sensor module 180 may include a temperature sensor, an acceleration module, a gyro sensor, a proximity sensor, a grip sensor, and the like. For one example, the sensor module 180 may measure a temperature at a specific point of the electronic device 101 using the temperature sensor. For another example, the sensor module 180 may sense motion (e.g., a rotational state, a movement state, a tilt, and the like) of the electronic device 101 using the acceleration sensor, the gyro sensor, and the like. For another example, the sensor module 180 may collect information about a user (e.g., a distance from the user) who uses the electronic device 101 using the proximity sensor, the grip sensor, and the like.

The sensor module 180 may provide the collected information to the processor 120. In various embodiments, the electronic device 101 may change an output mode or an output device according to execution of a function or an application based on information measured by the sensor module 180.

Figure 2:
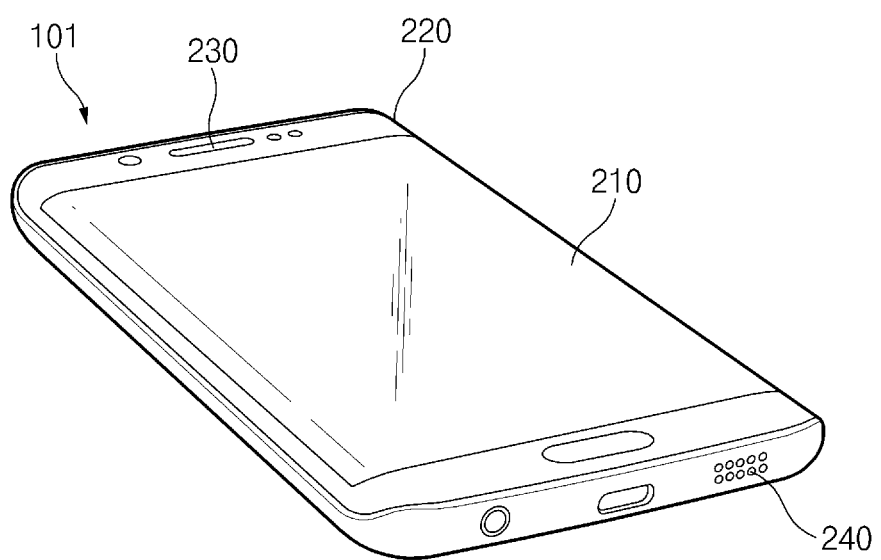
FIG. 2 is a diagram illustrating an example electronic device according to various example embodiments.

FIG. 2 is a diagram illustrating an example electronic device according to various example embodiments. In FIG. 2, an embodiment of the disclosure is exemplified as the electronic device 101 is a smartphone. However, embodiments of the disclosure are not limited thereto. For example, the electronic device 101 may be a device such as a tablet personal computer (PC), a smart watch, a smart glass, or a gear virtual reality (VR).

Referring to FIG. 2, the electronic device 101 may include a display 210 and a body part 220.

The display 210 (e.g., a display module 160 of FIG. 1) may output a variety of content such as an image and text. The display 210 may include a touch panel and may detect a touch input of a user of an electronic device 101.

The body part 220 may be equipped with the display 210 and may include various components necessary for an operation of the electronic device 201. A physical button (e.g., a home button, a power button, a volume button, and the like) may be mounted on the outside of the body part 220, and at least part of a proximity sensor and the like may be exposed. A processor 120, a communication interface 170, a sensor module 180, and the like may be included in the body part 220.

According to various embodiments, a first speaker 230 and a second speaker 240 may be mounted on the outside of the body part 220. The first speaker 230 and the second speaker 240 may have different output ranges (e.g., a frequency range and a volume level). In FIG. 2, an embodiment of the disclosure is exemplified as the first speaker 230 is disposed at a front upper end of the electronic device 201 and the second speaker 240 is disposed at a lower side of the second speaker 240. However, embodiments of the disclosure are not limited thereto. For example, the second speaker 240 may be disposed at a rear surface or at left and right sides of the electronic device 101.

The first speaker 230 may be a speaker which outputs a sound at a specified level or less. For example, after the user arranges the first speaker 230 to be adjacent to his or her ear, he or she may conduct a voice call over a microphone disposed at a lower end of the electronic device 101. In this case, the processor 120 in the body part 220 may set an audio path according to a call connection to the first speaker 230. The first speaker 230 may adjust an output within a specified range by a volume button.

The second speaker 240 may be a speaker having an output range which is broader than the first speaker 230. The second speaker 240 may be used to establish a call connection or to conduct a video call in an external speaker mode. Also, the second speaker 240 may output a sound based on video playback or sound source playback.

In various embodiments, the first speaker 230 and the second speaker 240 may selectively output a sound based on a temperature measured at a specific point (e.g., a point adjacent to a processor chip or a communication chip) of the electronic device 101.

For one example, in case of a voice call, if a temperature measured around the processor chip of the electronic device 101 is less than or equal to a specified value, the processor 120 may set the first speaker 230 to an audio path. In this case, the second speaker 240 may be in an inactive state. For another example, if a temperature around the processor chip is greater than a specific value (hereinafter referred to as "threshold") due to a continuous call, the processor 120 may automatically change the second speaker 240 to an audio path or may change the second speaker 240 to the audio path by selection of the user (e.g., may output a pop-up window for changing an audio path). In this case, the first speaker 230 may be in an inactive state. Additional information about changing outputs of the first speaker 230 and the second speaker 240 based on a temperature may be provided with reference to FIG. 5.

Figure 3:
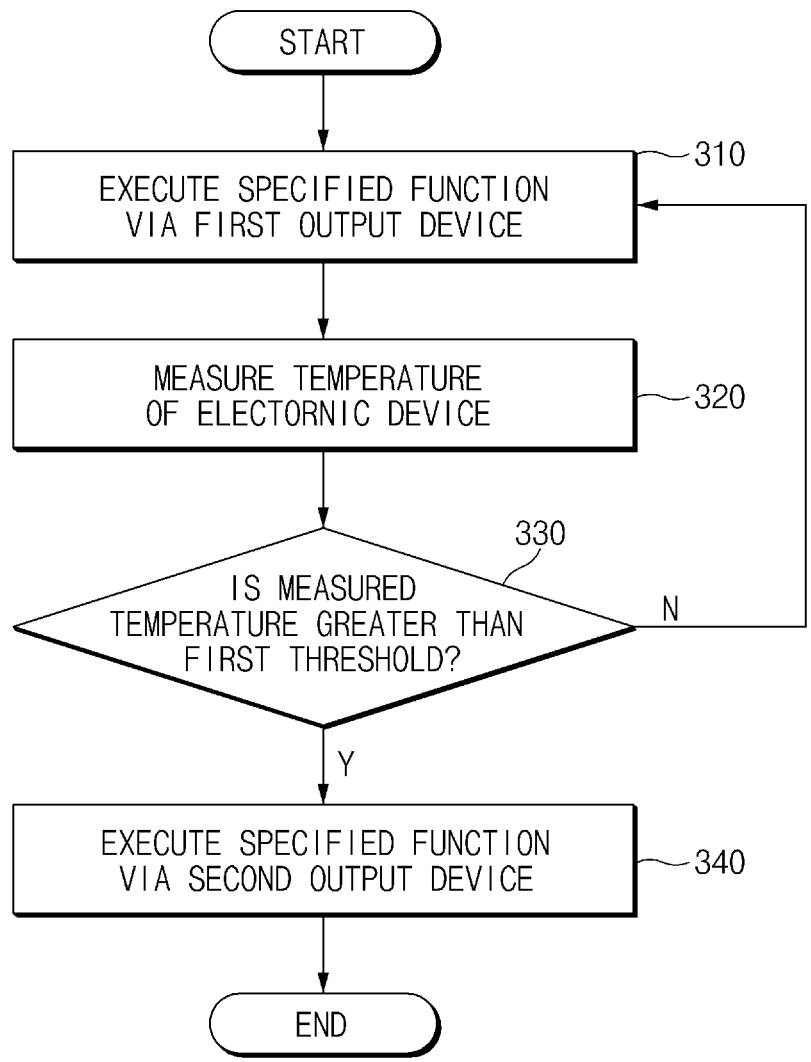
FIG. 3 is a flowchart illustrating an example output method according to various example embodiments.

FIG. 3 is a flowchart illustrating an example output method according to various example embodiments.

Referring to FIG. 3, in operation 310, a processor 120 of FIG. 1 may execute a specific function (e.g., a voice call, video playback, music playback, and the like) via a first output device (e.g., a first speaker 230 of FIG. 2). For one example, the processor 120 may set the first speaker 230 to an audio path of the voice call. If receiving a call via a communication interface 170 of FIG. 1, the processor 120 may output a sound of a voice call via the first speaker 230. For another example, the processor 120 may output a sound in which a sound source is reproduced via a second speaker 240 of FIG. 2 or may output a sound based on video playback.

In operation 320, a sensor module 180 of FIG. 1 may measure a temperature of a specific point of an electronic device 101 of FIG. 1 (e.g., a point adjacent to a processor chip or a communication chip). The sensor module 180 may provide the measured temperature value to the processor 120. In various embodiments, the sensor module 180 may collect information about whether a user of the electronic device 101 accesses the electronic device 101 or whether he or she holds the electronic device 101 (hereinafter referred to as "information about the user") using a proximity sensor, an illumination sensor, and the like. In various embodiments, the sensor module 180 may collect information about rotation, a tilt, a movement speed, and the like of the electronic device 101 (hereinafter referred to as "information about the electronic device 101") using a geomagnetic sensor, an acceleration sensor, and the like. The information about the user or the information about the electronic device 101 may be provided to the processor 120 and may be used to change an output mode or an output device of content (e.g., a sound, an image, a voice call, a video call, a voice output, a video output, and the like).

In operation 330, the processor 120 may determine whether the temperature measured via the sensor module 180 is greater than (or greater than or equal to) a first threshold. The first threshold may be a temperature having a possibility that the user will feel displeasure or that degradation or deterioration in performance of a component of the electronic device 101 will occur. The first threshold may be preset or may be set by selection of the user.

In various embodiments, if the measure temperature is less than or equal to (or less than) the first threshold, the processor 120 may maintain a current output state via the first output device (e.g., the first speaker 230). If a temperature of a specific point of the electronic device 101 is lower than the first threshold value, there may be a low possibility that the user will not feel uncomfortable or that deterioration in performance of a component of the electronic device 101 will occur.

According to various embodiments, the processor 120 may divide a period into a plurality of periods using one or more threshold and may set an output mode in each of the periods in a different way. For example, the processor 120 may divide a period into a first period and a second period using one threshold, may perform a function in the first period using the first output device, and may perform a function in the second period using a second device. For another example, the processor 120 may divide a period into a first period to a third period using two thresholds and may set a different mode in each of the first period to the third period. Information about dividing a temperature period using one or more thresholds may be provided with reference to FIG. 4.

In operation 340, the processor 120 may change the first output device to the second output device and may execute a specified function via the second output device. In various embodiments, the second output device may be an output device which is available in a state where the user is distant at a specific distance or more from the electronic device 101 or may be an output device which may reduce a temperature of the electronic device 101. For one example, if a temperature of the electronic device 101 is greater than the first threshold during a voice call, the processor 120 may change an audio path from the first speaker 230 to the second speaker 240. For another example, if the temperature of the electronic device 101 is greater than the first threshold while reproducing a video via the second speaker 240, the processor 120 may change an audio path to an accessory device (e.g., a Bluetooth interworking earphone) which interworks with the electronic device 101.

According to various embodiments, the processor 120 may control or process content (e.g., a sound, an image, a voice call, a video call, a voice output, a video output, and the like) to be output, based on at least one of condition 1 to 3 below.

1 Device characteristics (e.g., a distance between the user and the second output device, output strength, and an output type (a voice, a video, vibration, and the like)) of the second output device itself.

2 A difference in characteristics (e.g., a difference in relative distance from the user, a difference in output strength, and a difference in output type) between the second output device and the first output device.

3 A type of content (e.g., a voice, a video, vibration, and the like) to be output.

According to various embodiments, if both of the first output device and the second output device are sound output devices and if the second output device is disposed to be relatively more distant from the user than the first output device, the processor 120 may set output strength (e.g., volume) of the second output device to be higher than that of the first output device. For example, if the first output device is the second speaker 240 of the electronic device 101, if the second output device is a speaker of a smart watch which interworks with the electronic device 101, and if the smart watch is relatively distant from the user (by location comparison via a proximity sensor or a global positioning system (GPS) and the like), the processor 120 may set volume of the speaker of the smart watch to be higher than volume set in the second speaker 240.

According to various embodiments, if an output direction of the second output device is different from an output direction of the first output device, the processor 120 may adjust output strength of the second output device. In the example above, if the second speaker 240 heads for the user and if the speaker of the smart watch heads for an opposite direction from the user (herein, a location of an output device and a location of the user are recognized via a gyro sensor or a proximity sensor and the like), the processor 120 may set volume of the speaker of the smart watch to be higher than volume set in the second speaker 240.

According to various embodiments, if the second output device is a device which may output a higher-quality sound than the first output device, the processor 120 may output a high-quality sound via the second output device based on a temperature of the electronic device 101. In the example above, the processor 120 may reduce computation for outputting a sound of the electronic device 101 and may reduce a temperature by allowing the smart watch to perform computation for outputting a high-quality output.

According to various embodiments, if the second output device is a device which may output a lower-quality sound than the first output device, the processor 120 may output content using a low-quality sound via the second output device. For example, the processor 120 may output content via the second speaker 240 of low quality rather than the first speaker 230 of high quality to reduce a temperature of the electronic device 101.

According to various embodiments, if the first output device is a sound output device and if the second output device is a video output device, the processor 120 may convert a sound (e.g., a voice) into text and may output the text via an application installed in the electronic device 101 or an external device (e.g., a server 106 of FIG. 1). For example, the processor 120 may convert a sound into text using a conversion application (e.g., a speak to text (STT) app) installed in the electronic device 101 or via an external server and may output the converted text via the second output device.

In various embodiments, if the second output device is a video output device (e.g., a display of a wearable device (e.g., an electronic device 102 of FIG. 1) which interworks with the electronic device 101), the processor 120 may control a size of text to be displayed, based on a distance from a user of the second output device. For one example, if the user is relatively distant from the second output device (herein, the user is recognized via a proximity sensor or a gyro sensor and the like), the processor 120 may output text to be larger in size than text based on a default setting. For another example, if the user is relatively close to the second output device, the processor 120 may output text to be smaller in size than the text based on the default setting.

In various embodiments, if power consumed by the second output device is higher than power consumed by the first output device, the processor 120 may decrease output strength or output brightness of the second output device to a specified value or less.

In various embodiments, the first output device or the second output device may include a speaker, a display, a light emitting diode (LED) lamp, or any combination thereof.

According to various embodiments, An output method performed in an electronic device may include performing a function using a first output device operatively connected with the electronic device, measuring a temperature of the electronic device using a sensor module of the electronic device and performing at least part of the function using a second output device operatively connected with the electronic device, if the temperature is included in a range.

According to various embodiments, the performing of the at least part of the function using the second output device may include performing the function using the second output device, if the temperature is greater than the first threshold.

According to various embodiments, the performing of the at least part of the function using the second output device may include verifying at least one of a rotation direction or a movement state of the electronic device, if the temperature is greater than the first threshold and performing the function using the second output device, the electronic device is in a state.

According to various embodiments, the performing of the at least part of the function using the second output device may include performing the at least part of the function using an output device connected to an external electronic device operatively connected with the electronic device.

Figure 4:
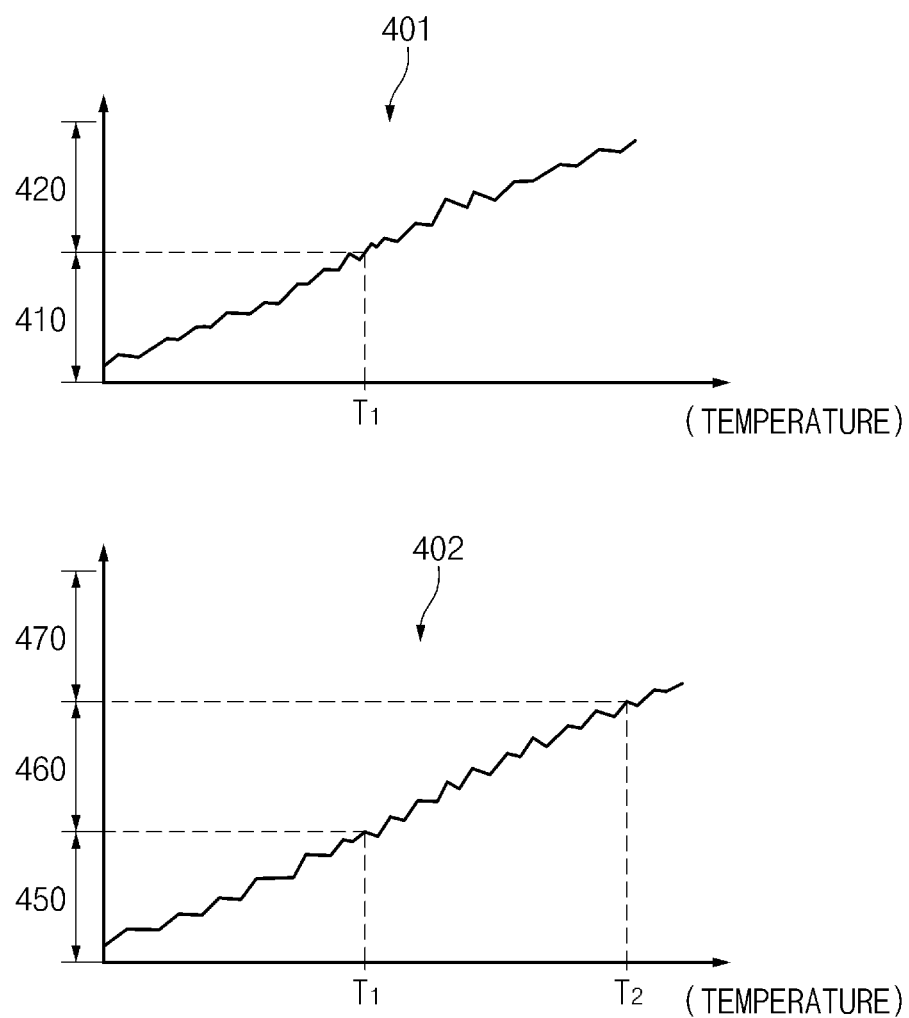
FIG. 4 are graphs illustrating an example change in temperature based on an operation of an electronic device according to various example embodiments.

FIG. 4 are graphs illustrating an example change in temperature based on an operation of an electronic device according to various example embodiments. In FIG. 4, an embodiment of the disclosure is exemplified as an output mode or an output device is changed using one threshold or two thresholds. However, embodiments of the disclosure are not limited thereto. In FIG. 4, an embodiment of the disclosure is exemplified as a temperature of the electronic device is gradually increased as the electronic device continuously uses at least one function. However, embodiments of the disclosure are not limited thereto.

Referring to FIG. 4, an electronic device 101 of FIG. 4 may be continuously increased in temperature and may be increased to a range or more due to subsequent use (e.g., a voice call for a long time and video playback for a long time). If the electronic device 101 is increased in temperature, a user of the electronic device 101 may feel uncomfortable to hold and use the electronic device 101 and may get scalded in severe case. Also, if the electronic device 101 is increased in temperature, there may be degradation in performance of a component (e.g., a module, a chip, and the like) included in the electronic device 101 or a fault may occur due to deterioration.

If a temperature of the electronic device 101 is greater than or equal to a threshold with respect to one or more thresholds, a processor 120 of FIG. 1 may change an output mode or an output device automatically or based on selection of the user.

Graph 401 illustrates that a temperature period is divided relative to one threshold (e.g., a first threshold $T_1$) and an output mode is changed. In graph 401, a sensor module 180 of FIG. 1 may measure a temperature of a specific point (e.g., a point around the processor 120) of the electronic device 101 continuously or at specified periods.

According to various embodiments, if a specified condition is met, the sensor module 180 may be configured to measure a temperature. For one example, if a specified application (e.g., a voice call app, a video playback app, and the like) is executed, the sensor module 180 may start to measure a temperature. For another example, if the user holds the electronic device 101 (herein, the holding of the electronic device 101 is recognized via a grip sensor) and if he or she is within a specified distance from the electronic device 101 (herein, the distance from the electronic device 101 is recognized via a proximity sensor), the sensor module 180 may measure a temperature of the electronic device 101.

A first period 410 and a second period 420 may be divided by the first threshold 120. The processor 120 may maintain a current output mode in the first period 410. For one example, if a temperature of the electronic device 101 is less than or equal to the first threshold $T_1$ during a voice call, the processor 120 may continue outputting a voice via a first speaker 230 of FIG. 2. For another example, if the temperature of the electronic device 101 is less than or equal to the first threshold value T1 during video playback, the processor 120 may continue outputting a voice via a second speaker 240 of FIG. 2.

The processor 120 may change an output mode based on an executing function or an executing application, in the second period 420 where a temperature of the electronic device 101 is greater than the first threshold T1, automatically or by selection of the user. For one example, if the temperature of the electronic device 101 enters the second period during a voice call, the processor 120 may change an audio path from the first speaker 230 to the second speaker 240. For another example, if the temperature of the electronic device 101 enters the second period during video playback, the processor 120 may change an audio path from the second speaker 240 to an earphone which interworks with the electronic device 101.

In various embodiments, if the temperature of the electronic device 101 enters the second period, the processor 120 may automatically change an output mode. In another embodiment, if the temperature of the electronic device 101 enters the second period, the processor 120 may notify the user of whether to change an output mode (e.g., a notification sound, a notification voice, a pop-up window, and the like) and may change an output mode based on selection of the user.

Graph 402 illustrates that a temperature period is divided relative to two thresholds (e.g., the first threshold $T_1$ and a second threshold $T_2$) and an output mode is changed. In graph 402, the sensor module 180 may measure a temperature of a specific point (e.g., a point around the processor 120) of the electronic device 101 continually or at specified periods.

A first period 450, a second period 460, and a third period 470 may be divided by the first threshold $T_1$ and the second threshold $T_2$. The processor 120 may set a different output mode for each period.

For example, the processor 120 may maintain a current output mode in the first period 450. If the temperature of the electronic device 101 enters the second period 460, the processor 120 may operate in a mode for preventing degradation in performance based on deterioration (e.g., a mode for adjusting audio performance based on denoising, a volume level change, information about the user, or information about the electronic device 101) while maintaining a current output device. If the temperature of the electronic device 101 enters the third period 470, the processor 120 may change an output device (e.g., change an audio path from the first speaker 230 to the second speaker 240).

Figure 5:
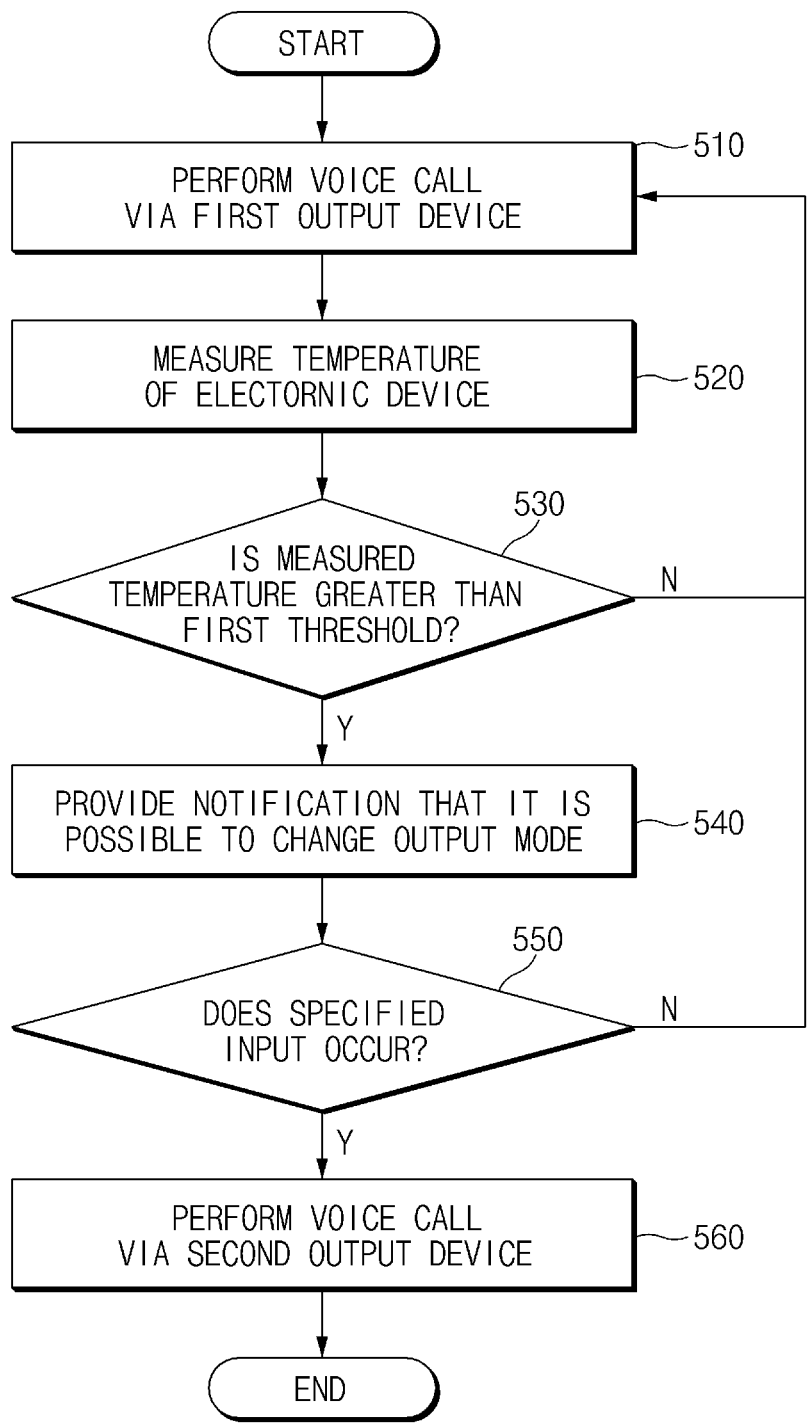
FIG. 5 is a flowchart illustrating an example process of changing an output mode based on a continuous voice call according to various example embodiments.

FIG. 5 is a flowchart illustrating an example process of changing an output mode based on a continuous voice call according to various example embodiments.

Referring to FIG. 5, in operation 510, a processor 120 of FIG. 1 may set a first output device (e.g., a first speaker 230 of FIG. 2) to an audio path during a voice call. For example, a user of an electronic device 101 of FIG. 1 may arrange the first speaker 230 to be close or adjacent to his or her ear and may perform a voice call using the electronic device 101.

In operation 520, a sensor module 180 of FIG. 1 may measure a temperature at a specific point (e.g., a point adjacent to a processor chip or a communication chip) of the electronic device 101. The sensor module 180 may provide the measured temperature value to the processor 120.

In operation 530, the processor 120 may determine whether the measured temperature is greater than a first threshold. For example, if the measured temperature is less than or equal to the first threshold, the processor 120 may maintain a voice call state via the current first speaker 230. The user may continue performing a voice call via the first speaker 230.

In operation 540, if the measured temperature is greater than the first threshold, the processor 120 may notify the user that it is possible to change an output mode. For one example, the processor 120 may output a beep sound via the first speaker 230 and may generate short vibration in the electronic device 101. For another example, the processor 120 may notify the user that it is possible to change an output mode, through a pop-up window. In various embodiments, operation 540 may be omitted. For example, after the temperature is greater than the first threshold in operation 530, the processor 120 may determine whether a specific input occurs in operation 550 without separate notification.

In operation 550, the processor 120 may determine whether the specified input occurs. If the user wants to change an output mode, he or she may generate the specified input in the electronic device 101 and may change an output device. In various embodiments, the specified input may be an input of changing a state of the electronic device 101 (e.g., a location, a tilt, a rotation direction, and the like of the electronic device 101). For example, the user listen to a beep sound, indicating that it is possible to change an output mode, during a voice call via the first speaker 230, he or she may changes a direction of the electronic device 101 (e.g., rotate the electronic device (e.g., rotate the electronic device 101 at 180 degrees in upper and lower directions, rotate the electronic device 101 at 180 degrees in left and right directions, rotate the electronic device 101 at 180 degrees in a longitudinal direction, and the like) or put the electronic device 101 on the bottom) and may change an output mode.

In operation 560, if the specified input occurs, the processor 120 may set a second output device (e.g., a second speaker 240 of FIG. 2) to an audio path. For example, the user may rotate the electronic device 101 in a specified direction or may put the electronic device 101 on the bottom, and may speak over the second speaker 240 in a handsfree mode. Although a temperature of the electronic device 101 is additionally increased, the user may continue making a call with the called party.

Figure 6:
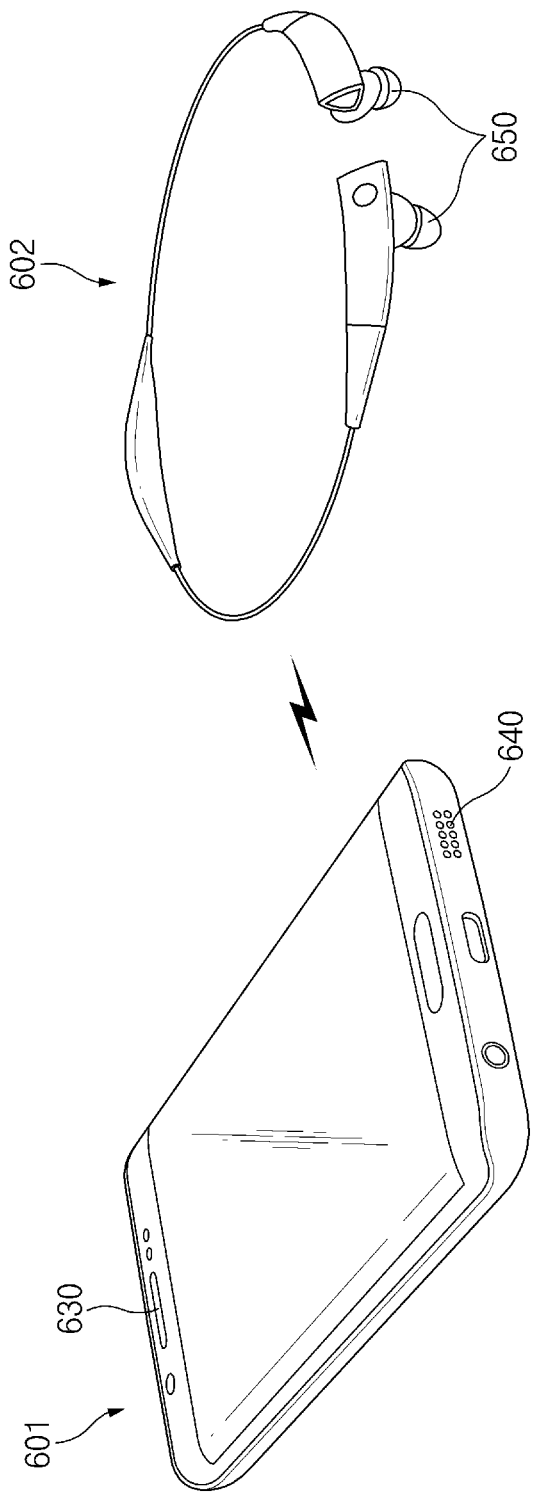
FIG. 6 is a diagram illustrating an example output method using a peripheral device which interworks with an electronic device according to various example embodiments.

FIG. 6 is a diagram illustrating an example output method using a peripheral device which interworks with an electronic device according to various example embodiments. In various embodiments, a first electronic device 601 may be an electronic device 101 of FIG. 1.

Referring to FIG. 6, the first electronic device 601 and a second electronic device 602 may interwork with each other through short-distance communication (e.g., Bluetooth communication). In FIG. 6, an embodiment of the disclosure is exemplified as the first electronic device 601 is a smartphone and the second electronic device 602 is an earphone. However, embodiments of the disclosure are not limited thereto.

The first electronic device 601 may execute a specified function (e.g., a voice call, video playback, and music playback) via a first output device (e.g., a first speaker 630). For one example, the first electronic device 601 may output a sound of a voice call via the first speaker 630. For another example, the first electronic device 601 may output a sound in which a sound source is reproduced or may output a sound based on video playback, via a second speaker 640.

If a temperature of a specific point is increased to be greater than a threshold while a specific function or application is executed, the first electronic device 601 may notify its user that it is possible to change an output mode. For example, the first electronic device 601 may output a beep sound via the first speaker 630 during a voice call.

The first electronic device 601 may determine whether a specified input occurs. For example, the first electronic device 601 may determine whether it rotates in a specified direction. The first electronic device 601 may detect its tilt, whether it moves, its rotation direction, and the like.

If the specific input occurs, the first electronic device 601 may set a speaker 650 of the second electronic device 602 to an audio path. If the specified input occurs while the first electronic device 601 outputs a sound via the first speaker 630 or the second speaker 640, it may output a sound via the speaker 650 of the second electronic device 602 which interworks with the first electronic device 601.

For one example, if the user listens to a beep sound as the first electronic device 601 is increased in temperature during a voice call, he or she may rotate the first electronic device 601 (e.g., rotate the first electronic device 601 at 180 degrees in upper and lower directions, rotate the first electronic device 601 at 180 degrees in left and right directions, rotate the first electronic device 601 at 180 degrees in a longitudinal direction, and the like) and may speak over the second electronic device 602 which interworks with the first electronic device 601. For another example, if the user verifies a pop-up window as the first electronic device 601 is increased in temperature during video playback, he or she touches the pop-up window and the first electronic device 601 may output a sound via the second electronic device 602 which interworks with the first electronic device 601.

Figure 7:
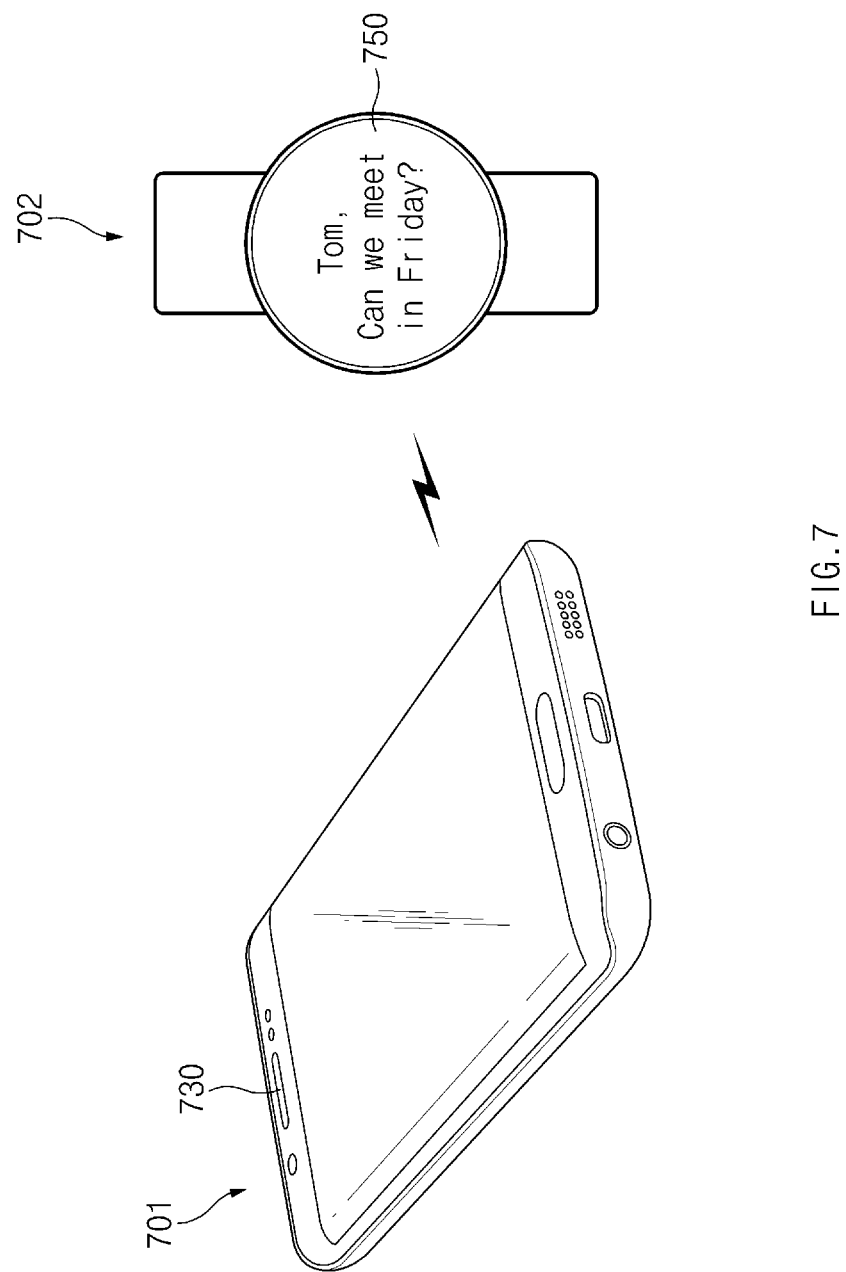
FIG. 7 is a diagram illustrating an example process of changing an output using a peripheral device which interworks with an electronic device according to various example embodiments.

FIG. 7 is a diagram illustrating an example process of changing an output using a peripheral device which interworks with an electronic device according to various example embodiments. In various embodiments, a first electronic device 701 may be an electronic device 101 of FIG. 1. In FIG. 7, an embodiment of the disclosure is exemplified as the first electronic device 701 is a smartphone and a second electronic device 702 is a smart watch. However, embodiments of the disclosure are not limited thereto.

The first electronic device 701 may execute a specified function (e.g., a voice call, video playback, and music playback) via a first output device (e.g., a first speaker 730). If a temperature of a specific point is increased to be greater than a threshold while a specific function or application is executed, the first electronic device 701 may notify its user that it is possible to change an output mode.

The first electronic device 701 may determine whether a specific input occurs. If the specific input occurs, the first electronic device 701 may convert a sound into text and may output the converted text on a display 750 of the second electronic device 702.

For one example, if the user listens to a beep sound as the first electronic device 701 is increased in temperature during a voice call, he or she may rotate the first electronic device 701 (e.g., rotate the first electronic device 701 at 180 degrees in upper and lower directions, rotate the first electronic device 701 at 180 degrees in left and right directions, rotate the first electronic device 701 at 180 degrees in a longitudinal direction, and the like) and may verify call contents in the form of text on the display 750 of the second electronic device 702 which interworks with the first electronic device 701. For another example, if the user verifies a pop-up window as the first electronic device 701 is increased in temperature during video playback, he or she may touch the pop-up window and the first electronic device 701 may output a screen on the display 705 of the second electronic device 702 which interworks with the first electronic device 701.

Figure 8:
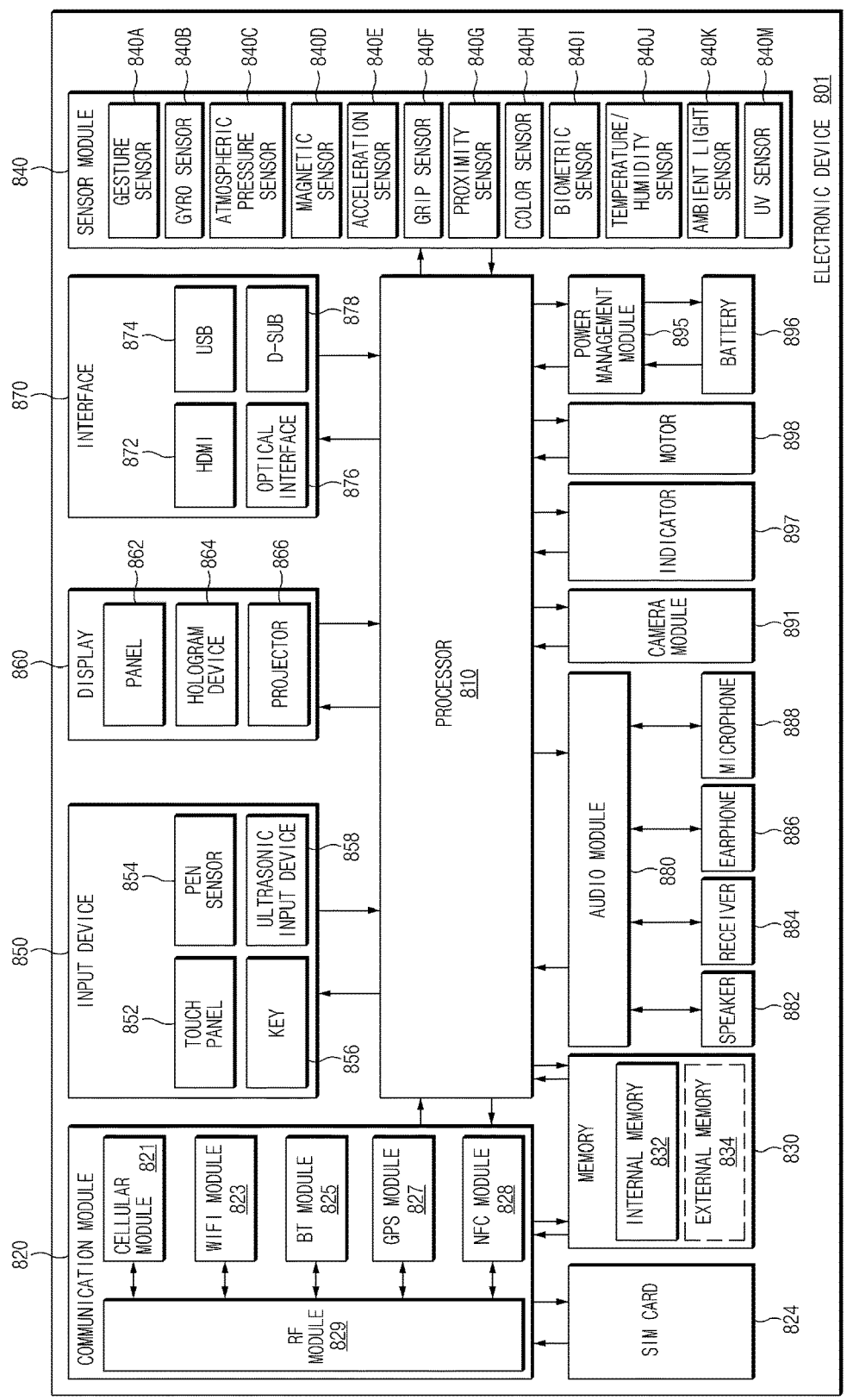
FIG. 8 is a block diagram illustrating an example configuration of an electronic device according to various example embodiments.

FIG. 8 is a block diagram illustrating an example electronic device according to various example embodiments. An electronic device 801 may include, for example, all or a part of the electronic device 101 illustrated in FIG. 1. The electronic device 801 may include one or more processors (e.g., an application processor (AP)) 810, a communication module (e.g., including communication circuitry) 820, a subscriber identification module 824, a memory 830, a sensor module 840, an input device (e.g., including input circuitry) 850, a display 860, an interface (e.g., including interface circuitry) 870, an audio module 880, a camera module 891, a power management module 895, a battery 896, an indicator 897, and a motor 898.

The processor 810 may drive an operating system (OS) or an application to control a plurality of hardware or software elements connected to the processor 810 and may process and compute a variety of data. The processor 810 may be implemented with a System on Chip (SoC), for example. According to an embodiment, the processor 810 may further include a graphic processing unit (GPU) and/or an image signal processor. The processor 810 may include at least a part (e.g., a cellular module 821) of elements illustrated in FIG. 8. The processor 810 may load and process an instruction or data, which is received from at least one of other elements (e.g., a nonvolatile memory) and may store a variety of data in a nonvolatile memory.

The communication module 820 may be configured the same as or similar to the communication interface 170 of FIG. 1. The communication module 820 may include various communication circuitry, such as, for example, and without limitation, a cellular module 821, a Wi-Fi module 823, a Bluetooth (BT) module 825, a GNSS module 827 (e.g., a GPS module, a Glonass module, a Beidou module, or a Galileo module), a near field communication (NFC) module 828, and a radio frequency (RF) module 829.

The cellular module 821 may provide voice communication, video communication, a message service, an Internet service or the like through a communication network. According to an embodiment, the cellular module 821 may perform discrimination and authentication of the electronic device 801 within a communication network using the subscriber identification module 824 (e.g., a SIM card), for example. According to an embodiment, the cellular module 821 may perform at least a portion of functions that the processor 810 provides. According to an embodiment, the cellular module 821 may include a communication processor (CP).

Each of the Wi-Fi module 823, the BT module 825, the GNSS module 827, and the NFC module 828 may include a processor for processing data exchanged through a corresponding module, for example. According to an embodiment, at least a part (e.g., two or more elements) of the cellular module 821, the Wi-Fi module 823, the BT module 825, the GNSS module 827, or the NFC module 828 may be included within one Integrated Circuit (IC) or an IC package.

The RF module 829 may transmit and receive, for example, a communication signal (e.g., an RF signal). The RF module 829 may include, for example, a transceiver, a power amplifier module (PAM), a frequency filter, a low noise amplifier (LNA), an antenna, or the like. According to another embodiment, at least one of the cellular module 821, the Wi-Fi module 823, the BT module 825, the GNSS module 827, or the NFC module 828 may transmit and receive an RF signal through a separate RF module.

The subscriber identification module 824 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 830 (e.g., the memory 130) may include an internal memory 832 or an external memory 834. For example, the internal memory 832 may include at least one of a volatile memory (e.g., a dynamic random access memory (DRAM), a static RAM (SRAM), or a synchronous DRAM (SDRAM), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 834 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 834 may be functionally and/or physically connected with the electronic device 801 through various interfaces.

The sensor module 840 may measure, for example, a physical quantity or may detect an operation state of the electronic device 801. The sensor module 840 may convert the measured or detected information to an electric signal. The sensor module 840 may include at least one of a gesture sensor 840A, a gyro sensor 840B, a barometric (e.g., atmospheric pressure) pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illuminance (e.g., ambient light) sensor 840K, or an UV sensor 840M. Even though not illustrated, additionally or alternatively, the sensor module 840 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor which is a part of the processor 810 or independent of the processor 810 and is configured to control the sensor module 840. The processor may control the sensor module 840 while the processor 810 remains at a sleep state.

The input device 850 may include various input circuitry, such as, for example, and without limitation, a touch panel 852, a (digital) pen sensor 854, a key 856, or an ultrasonic input unit 858. The touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a portion of a touch panel or may include an additional sheet for recognition. The key 856 may include, for example, a physical button, an optical key, a keypad, or the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 160) may include a panel 862, a hologram device 864, or a projector 866. The panel 862 may be configured the same as or similar to the display 160 of FIG. 1. The panel 862 may be implemented to be flexible, transparent or wearable, for example. The panel 862 and the touch panel 852 may be integrated into a single module. The hologram device 864 may display a stereoscopic image in a space using a light interference phenomenon. The projector 866 may project light onto a screen so as to display an image. The screen may be arranged inside or outside the electronic device 801. According to an embodiment, the display 860 may further include a control circuit for controlling the panel 862, the hologram device 864, or the projector 866.

The interface 870 may include various interface circuitry, such as, for example, and without limitation, a high-definition multimedia interface (HDMI) 872, a universal serial bus (USB) 874, an optical interface 876, or a D-subminiature (D-sub) 878. The interface 870 may be included, for example, in the communication interface 170 illustrated in FIG. 1. Additionally or alternatively, the interface 870 may include, for example, a mobile high definition link (MHL) interface, a SD card/multi-media card (MMC) interface, or an infrared data association (IrDA) standard interface.

The audio module 880 may convert a sound and an electrical signal in dual directions. At least a part of the audio module 880 may be included, for example, in the input/output interface 150 illustrated in FIG. 1. The audio module 880 may process, for example, sound information that is input or output through a speaker 882, a receiver 884, an earphone 886, or a microphone 888.

The camera module 891 for shooting a still image or a video may include, for example, at least one image sensor (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC) a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 896 and a voltage, current or temperature thereof while the battery is charged. The battery 896 may include, for example, a rechargeable battery or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate a vibration effect, a haptic effect, or the like. Even though not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), MediaFlo™, or the like.

According to various embodiments, an electronic device, includes a sensor module configured to sense a temperature of at least part of the electronic device and a processor configured to electrically connect with the sensor module, wherein the processor is configured to perform a function using a first output device operatively connected with the electronic device, verify a temperature of the electronic device using the sensor module, while the function is executed and perform at least part of the function using a second output device operatively connected with the electronic device, if the temperature is included in a range. The processor may be configured to deactivate the first output device in connection with performing the at least part of the function.

According to various embodiments, the processor may be configured to verify motion of the electronic device using another sensor operatively connected with the electronic device and perform the at least part of the function further based on the motion corresponding to a pattern.

According to various embodiments, the first output device includes a first speaker, and the second output device includes a second speaker different from the first speaker.

According to various embodiments, the processor may be configured to perform the at least part of the function by using an output device connected to an external electronic device operatively connected with the electronic device as the second output device.

According to various embodiments, the first output device or the second output device includes a speaker, a display, a light emitting diode (LED) lamp, or any combination thereof.

According to various embodiments, the processor may be configured to perform the function using the first output device, if the temperature is less than or equal to a first threshold and perform the function using the second output device, if the temperature is greater than the first threshold.

According to various embodiments, the processor may be configured to perform the function using the second output device based on automatically or an input of a user of the electronic device, if the temperature is greater than the first threshold. The input includes an operation of rotating the electronic device in a direction or an operation where the electronic device is distant from the user.

According to various embodiments, the processor may be configured to output a signal via the first output device, if the temperature is greater than the first threshold. The signal includes at least one of a beep sound, vibration, or a pop-up window.

According to various embodiments, the processor may be configured to perform the function using the first output device, if the temperature is less than or equal to a first threshold, change output strength or an output frequency of the first output device, if the temperature is greater than the first threshold or is less than a second threshold and perform the function using the second output device, if the temperature is greater than the second threshold.

According to various embodiments, the at least part of the function may be configured to be performed by execution of an application installed in the electronic device.

According to various embodiments, the processor may be configured to control an output of the second output device based on at least one of a device characteristic of the first output device or the second output device or a type of content output based on execution of the function. The device characteristic comprises at least one of a distance between each of the first output device and the second output device and a user of the electronic device, power consumed by each of the first output device and the second output device, or output quality of the content in each of the first output device and the second output device.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

The term "module" used in this disclosure may represent, for example, a unit including one or more combinations of hardware (e.g., circuitry), software and/or firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a processor (e.g., including processing circuitry, such as, for example, and without limitation, a CPU), a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

According to various embodiments, a computer-readable medium storing embodied thereon a program for executing a method, the method may include performing a function using a first output device operatively connected with an electronic device, measuring a temperature of the electronic device using a sensor module of the electronic device and performing at least part of the function using a second output device operatively connected with the electronic device, if the temperature is included in a range.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to various embodiments, if the electronic device is increased in temperature by subsequent execution of a function or application, it may reduce displeasure which may occur to the user and may provide a comfortable use environment by changing an output mode or an output device.

According to various embodiments, if the electronic device is increased in temperature based on execution of a function or application, it reduce deterioration in performance of its components or a possibility that a fault will occur by changing an output mode or an output device.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a sensor module configured to sense a temperature of at least part of the electronic device; and
   a processor electrically connected with the sensor module, wherein the processor is configured to:

perform a function using a first output device operatively connected with the electronic device;
determine a temperature of the electronic device using the sensor module, while the function is executed; and
perform at least part of the function using a second output device operatively connected with the electronic device, if the temperature is within in a predetermined temperature range.

2. The electronic device of claim 1, wherein the processor is configured to deactivate the first output device.

3. The electronic device of claim 1, wherein the processor is configured to:
determine a motion of the electronic device using another sensor operatively connected with the electronic device; and
perform the at least part of the function further based on the motion corresponding to a pattern.

4. The electronic device of claim 1, wherein the first output device comprises a first speaker, and
wherein the second output device comprises a second speaker different from the first speaker.

5. The electronic device of claim 1, wherein the processor is configured to perform the at least part of the function using an output device connected to an external electronic device operatively connected with the electronic device as the second output device.

6. The electronic device of claim 1, wherein the first output device or the second output device comprises at least one of a speaker, a display, and a light emitting diode (LED) lamp.

7. The electronic device of claim 1, wherein the processor is configured to:
perform the function using the first output device, if the temperature is less than or equal to a first threshold temperature; and
perform the function using the second output device, if the temperature is greater than the first threshold temperature.

8. The electronic device of claim 7, wherein the processor is configured to perform the function using the second output device automatically or based on a received input, if the temperature is greater than the first threshold temperature.

9. The electronic device of claim 8, wherein the input comprises:
an operation of rotating the electronic device in a predetermined direction; or
an operation where the electronic device is greater than a predetermined distance from the user.

10. The electronic device of claim 8, wherein the processor is configured to output a signal via the first output device, if the temperature is greater than the first threshold temperature.

11. The electronic device of claim 10, wherein the signal comprises at least one of a sound, a vibration, and a pop-up window.

12. The electronic device of claim 1, wherein the processor is configured to:
perform the function using the first output device, if the temperature is less than or equal to a first threshold temperature;
change an output strength or an output frequency of the first output device, if the temperature is greater than the first threshold temperature and is less than a second threshold temperature; and
perform the function using the second output device, if the temperature is greater than the second threshold temperature.

13. The electronic device of claim 1, wherein the at least part of the function includes execution of an application installed in the electronic device.

14. The electronic device of claim 1, wherein the processor is configured to control an output of the second output device based on at least one of a device characteristic of the first output device and the second output device, or a type of content output based on execution of the function.

15. The electronic device of claim 14, wherein the device characteristic comprises at least one of a first distance between the first output device and a user of the electronic device, a second distance between the second output device and the user of the electronic device, a power consumed by each of the first output device and the second output device, or an output quality of the content in each of the first output device and the second output device.

16. An output method performed in an electronic device, the method comprising:
performing a function using a first output device operatively connected with the electronic device;
measuring a temperature of the electronic device using a sensor module of the electronic device; and
performing at least part of the function using a second output device operatively connected with the electronic device, if the temperature is within a predetermined temperature range.

17. The method of claim 16, wherein the performing of the at least part of the function using the second output device comprises:
performing the function using the second output device, if the temperature is greater than a first threshold temperature.

18. The method of claim 17, wherein the performing of the at least part of the function using the second output device comprises:
determining at least one of a rotation direction or a movement state of the electronic device, if the temperature is greater than the first threshold temperature; and
performing the function using the second output device, the electronic device is in a predetermined movement state.

19. The method of claim 17, wherein the performing of the at least part of the function using the second output device comprises:
performing the at least part of the function using an output device connected to an external electronic device operatively connected with the electronic device.

20. A non-transitory computer-readable medium storing thereon a program which, when executed by a processor causes the processor to perform a method, the method comprising:
performing a function using a first output device operatively connected with an electronic device;
measuring a temperature of the electronic device using a sensor module of the electronic device; and
performing at least part of the function using a second output device operatively connected with the electronic device, if the temperature is within a predetermined temperature range.

* * * * *